(12) United States Patent
Daruwalla et al.

(10) Patent No.: US 6,430,700 B1
(45) Date of Patent: *Aug. 6, 2002

(54) SYSTEM AND METHOD FOR FAULT RECOVERY FOR A TWO LINE BI-DIRECTIONAL RING NETWORK

(75) Inventors: Feisal Daruwalla, Santa Clara; Hon Wah Chin, Palo Alto; David Tsiang, Menlo Park, all of CA (US); George Suwala, Gloucester (CA); Tony Bates, Redwood City, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/910,467

(22) Filed: Jul. 19, 2001

Related U.S. Application Data

(63) Continuation of application No. 09/067,482, filed on Apr. 27, 1998, now Pat. No. 6,269,452.

(51) Int. Cl.⁷ .................................................. G06F 11/00
(52) U.S. Cl. ............................ 714/4; 714/43; 709/251; 370/222
(58) Field of Search ................................ 714/4, 43, 55, 714/717; 709/207, 238, 240, 251; 370/216, 221, 222, 223, 224

(56) References Cited

U.S. PATENT DOCUMENTS

| | | | |
|---|---|---|---|
| 4,847,610 A | 7/1989 | Ozawa et al. | 340/825.16 |
| 5,319,633 A | 6/1994 | Geyer et al. | 370/17 |
| 5,341,364 A | 8/1994 | Marra et al. | 370/16.1 |
| 5,442,620 A | 8/1995 | Kremer | 370/16.1 |
| 5,469,428 A | 11/1995 | Tokura et al. | 370/16.1 |
| 5,550,805 A | 8/1996 | Takatori et al. | 370/16.1 |
| 5,663,950 A | 9/1997 | Lee et al. | 370/224 |
| 5,712,968 A | 1/1998 | Nakayama et al. | 395/182.02 |
| 5,737,310 A | 4/1998 | Goto | 370/222 |
| 5,949,755 A | 9/1999 | Uphadya et al. | 370/224 |
| 6,269,452 B1 * | 7/2001 | Daruwalla et al. | 714/4 |
| RE37,401 E * | 10/2001 | Yamashita et al. | 714/717 |

OTHER PUBLICATIONS

ANSI "American National Standard for Telecommunications—Synchronous Optical Network (SONET)—Automatic Protection Switching," American National Standards Institute, New York, Nov. 15, 1995.
Bellcore GR–1230–CORE "SONET Bidirectional Line–Switched Ring Equipment Generic Criteria," Issue 3, Dec. 1996.
Bellcore GR–1230–CORE "SONET Bidirectional Line–Switched Ring Equipment Generic Criteria," Issue 3A, Dec. 1996.
Bellcore "Digest of Technical Information," SR–104, vol. 15, Issue 2, Feb. 1998.

* cited by examiner

*Primary Examiner*—Scott T. Baderman
(74) *Attorney, Agent, or Firm*—Van Pelt & Yi LLP

(57) ABSTRACT

The present invention provides a protection protocol for fault recovery, such as a ring wrap, for a network, such as a two line bidirectional ring network. An embodiment of the present invention works in conjunction with a ring topology network in which a node in the network can identify a problem with a connection between the node and a first neighbor. The present invention provides a protection protocol which simplifies the coordination required by the nodes in a ring network. The nodes do not need to maintain a topology map of the ring, identifying and locating each node on the ring, for effective protection. Additionally, independently operating ring networks can be merged and the protection protocol will appropriately remove a protection, such as a ring wrap, to allow the formation of a single ring. It also provides for multiple levels of protection priority so that protection for a high priority failure, such as a physical break in a connection, would remove protection for a low priority failure, such as a signal degrade, on another link.

56 Claims, 11 Drawing Sheets

300

300

SYSTEM AND METHOD FOR FAULT RECOVERY FOR A TWO LINE BI-DIRECTIONAL RING NETWORK

This is a Continuation of application Ser. No. 09/067,482, filed Apr. 27, 1998, now U.S. Pat. No. 6,269,452 which is hereby incorporated by reference.

BACKGROUND OF THE INVENTION

1. Field of the Invention

The present invention relates to computer networks. In particular, the present invention relates to a system and method for providing a protection protocol for fault recovery for a two line bi-directional ring network.

2. Background of the Invention

The need for cooperation among various computers has motivated the growth of efficient architectures of networks. One topology of networks is a ring network, such as FDDI and SONET.

FIG. 1 shows an example of a two line bi-directional ring network. The ring network 100 is shown to include nodes 102a–102g. Each node is typically a computer with embedded processors and at least one network connection. Each node 102a–102g is shown to be bidirectionally coupled to two neighboring nodes 102a–102g via an inner connection ring 110a–110g and an outer connection ring 108a–108g. For instance, node 102a is bidirectionally coupled to nodes 102b and 102g. The example of FIG. 1 also shows a problem 104 in the connection between node 102b and node 102c. When a problem is detected (such as a bi-directional line cut), the connection between nodes 102b and 102d wraps back upon itself, as shown by wraps 106a and 106b. In this manner, the connection problem 104 can be avoided.

In a conventional SONET Line Switched Network, the nodes on each side of the problem 104 will typically exchange messages with each other over the long path. In this example, node 102b would send a message to node 102c via connection 110g, and vice versa, via connection 108g. In a conventional SONET Line Switched Ring Network, the nodes on each side of the problem 104 will typically exchange messages with each other over the long path. The long path is the path that passes the other nodes in the ring network to reach a neighbor of the node that originated the message. For example, a long path from node 102b to node 102c would pass through nodes 102a–102d via outer ring 108a–108f.

When both the nodes flanking the problem 104 receive the other nodeis message, then these nodes will typically perform a wrap. For example, when nodes 102b and 102c receive each otheris message indicating the detection of the problem 104, nodes 102b and 102c will perform wraps 106a and 106b. In order to send these messages, each node that sends a message must typically know the identity and location of the receiving node. If the identity and location of the receiving node is not accurate, then there will typically be a failure to wrap.

In a conventional SONET network, each message sent by a sending node to a receiving node typically needs the identification and location of the receiving node to arrive at the proper destination. Accordingly, manual configuration is typically needed in each node to store the identity and location of each other node in the ring network in order to provide for communication between the nodes in the network.

A problem can arise when a new node is coupled into the ring network. Each node then typically needs to have its topology map of the ring network reconfigured such that the identity and location of the new node in the ring network can be included. Additionally, the locations of at least some of the original nodes may also change and these changes should also be included in each nodeis internal map of the network. Until and unless these new locations and identities can be included in a sending nodeis internal map of the network, messages sent by a node indicating that a problem has been detected will typically not arrive at the proper destination node. When these message fail to arrive at the proper destination, the required ring wraps will also fail to occur.

Likewise, if two ring networks are merged into one, each node will then typically need to have its internal map of the ring network configured to include the identities and locations of each node included in the merged ring network. These reconfigurations typically require the time and effort of a programmer or network administrator. Again, unless and until these new locations and identities can be included in a sending nodeis internal map of the network, messages sent by that node will typically not arrive at the proper destination node. In summary, for the protection mechanism to operate, each node needs to know the current ring map (current ring topology). Accordingly, required ring wraps will fail to occur.

In summary, for the protection mechanism to operate, each node needs to know the current ring map (current ring topology). What is needed is a system and method for providing fault recovery for two line bi-directional ring network that minimizes the need to keep track of other nodes in the ring network. Preferably, the system would not require reconfiguration of an internal map of the network when a new node is added to, or existing nodes are removed from the network. The present invention addresses such a need.

SUMMARY OF THE INVENTION

The present invention provides a protection protocol for fault recovery, such as a ring wrap, for a network, such as a two line bi-directional ring network. An embodiment of the present invention works in conjunction with a ring topology network in which a node in the network can identify a problem with a connection between the node and a first neighbor. According to the embodiment, when the problem is identified, the node sends a message identifying the problem to a second neighbor which is located at least one node away from the problem. The second neighbor then forwards the message to a third neighbor, unless the second neighbor is dealing with a situation that is higher in a hierarchy of situations than the problem described in the message by the original node. In general, if the second neighboris situation has a higher priority than the situation described by the original node, then the message is ignored and not forwarded. If, however, the message sent by the original node describes a situation with a higher priority than the situation being dealt with by the second neighbor, then, in general, the second neighboris situation is ignored, at least for the moment, and the original nodeis message is forwarded to the next neighbor. In general, a higher priority request preempts a lower priority request within the ring. Exceptions are noted as rules of the protection protocol.

The present invention provides a protection protocol that simplifies the coordination required by the nodes in a ring network. The nodes do not need to maintain a topology map of the ring, identifying and locating each node on the ring, for effective protection. Additionally, independently operating ring networks can be merged and the protection protocol automatically appropriately removes a protection, such as a ring wrap, to allow the formation of a single ring. It also provides for multiple levels of protection priority so that protection for a high priority failure, such as a physical break in a connection, removes protection for a low priority failure, such as a signal degrade, on another link.

A method according to an embodiment of the present invention for fault recovery for a ring computer network, the ring network including a plurality of nodes, is presented. The method comprises detecting a situation by a first node, wherein the first node is one of the plurality of nodes; sending a first message via a short path to a second node, wherein the first node is adjacent to the second node; and initiating a fault recovery procedure when the second node receives the first message.

In another aspect of an embodiment of the present invention, a method for adding a new node to a ring computer network, the ring network including a plurality of nodes, is presented. The method comprises detecting a situation by a first node, wherein the first node is one of the plurality of nodes; sending a first message via a short path to a second node, wherein the first node is adjacent to the second node prior to an addition of the new node; initiating a fault recovery procedure when the second node receives the first message; receiving a second message from the new node; and entering an idle state when the second message is received.

In yet another aspect of an embodiment of the present invention, a system for fault recovery for a ring computer network, the ring network including a plurality of nodes, is presented. The system comprises means for detecting a situation by a first node, wherein the first node is one of the plurality of nodes; means for sending a first message via a short path to a second node, wherein the first node is adjacent to the second node; and means for initiating a fault recovery procedure when the second node receives the first message

DETAILED DESCRIPTION OF THE PREFERRED EMBODIMENTS

Figure 1:
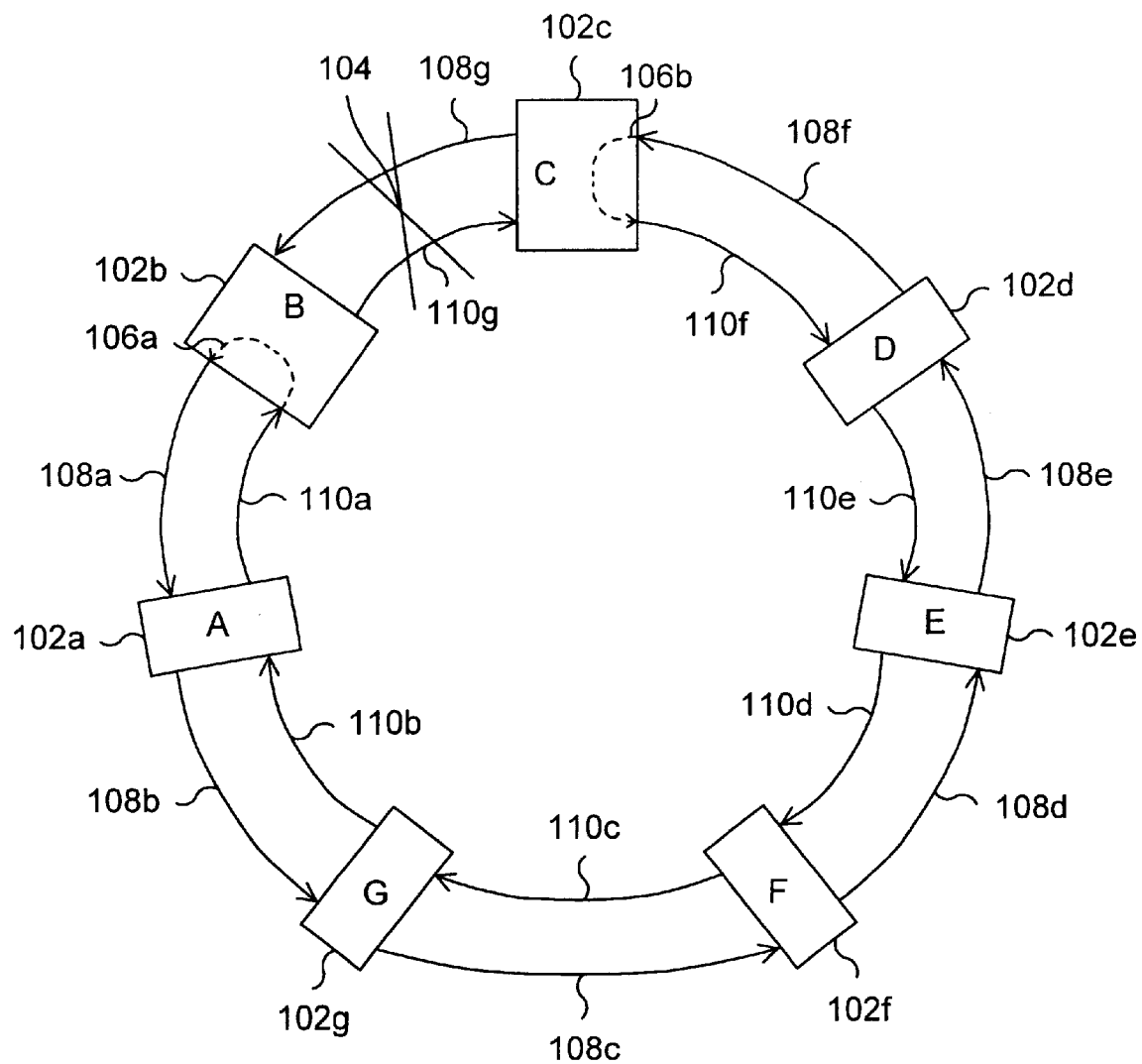
FIG. 1 is a block diagram illustrating a ring network that is utilizing a ring wrap protection.

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown and is to be accorded the widest scope consistent with the principles and features described herein.

For ease of reference, the packet transfer mechanism, the signaling and wrapping mechanism, and the protocol rules according to an embodiment in the present invention are first briefly listed. Further details of the mechanisms and rules according to the present invention will be described in conjunction with FIGS. 2–12. The following rules are numbered simply for ease of reference and should not be inferred that they are to be executed in any particular order. These rules are referenced herein by rule number for simplicity.

Spatial Reuse Protocol (SRP) Automatic Protection Switching (APS) Packet Transfer Mechanism 1. APS packets can be transferred between nodes. The packets can be stored and forwarded between adjacent nodes.
2. All APS messages are sent to the neighboring nodes periodically on both inner and outer rings. The time periods are user configurable. Examples of a time period is 10 msec. when a protection, such as a ring wrap, is taking place, and 1 sec. when a ring wrap is has either completed or the ring is in IDLE state. Providing short and long time periods can reduce APS traffic under steady state conditions.

SRP ASP Signaling and Wrapping Mechanism

3. APS signaling can be performed using packets carrying information such as a request, a source, a wrap status, and a path indicator.
4. A node executing a self detected request signals the protection request, such as a wrap request, on both short (across the failed span) and long (around the ring) paths after performing the wrap.
5. The node executing a short path protection request (i.e. receiving node of a short path protection request) sends an idle message with wrapped status across the failed span and a protection request on the long (around the ring) path after performing a wrap.
6. A node which is neither executing a self detected request nor executing a short path request sends idle messages to its neighbors on the ring if there is no long path message passing through the node on that ring.
7. Protection APS packets are not wrapped.

SRP APS Protocol Rules

8. A protection request hierarchy is utilized. In general, a higher priority request preempts a lower priority request within the ring. Exceptions are noted as rules. The following is a list of the protection request hierarchy listed in the order of highest priority:

Lockout of Protection (LO)

Forced Switch (FS)

Signal Fail (SF)

Signal Degrade (SD)

Manual Switch (MS)

Wait-to-Restore (WTR)

No Request (IDLE)

9. Requests which are higher or of equal priority to SF and lower priority to LO can co-exist.

10. LO requests can co-exist.
11. Requests with lower priority than SF cannot co-exist with other requests.
12. A node honors the highest of (short path request, self-detected request) if there is no higher long path message passing through the node.
13. When there are multiple requests of the same priority, the priority being lower than SF, the first request to complete long path signaling will take priority. The first request to complete long path signaling refers to the first request that reaches a node determining which request takes priority.
14. In case of two equal requests on both inner and outer rings, when their priority is less than SF, the tie is broken by choosing a pre-determined ring. For example, the outer ring request can be selected.
15. A node does not forward a long APS packet received by it that was originally generated by the node itself.
16. Nodes do not forward packets with the path indicator set to short (short path).
17. When a node receives a long path request and the request has a priority which is greater or equal to the highest of (short path request, self detected request), the node determines if the same message is coming from its neighbor on a short path. If that is the case, then the node does not unwrap.
18. When a node receives a long path request, it terminates the request (does not forward) if the receiving node is a wrapped node and it is in a situation which is of higher or equal priority than the long path request. Otherwise, it forwards the long path request and determines if it needs to unwrap.
19. Each node keeps track of the addresses of its immediate neighbors (the neighbor node address can be gleaned from the short path APS messages).
20. When a wrapped node (which initially detected the failure) discovers disappearance of the failure, it enters WTR (long, user - configurable, WTR time period).
21. When a node is in WTR mode, and detects that the new neighbor (as can be identified from the received APS short path message) is not the same as the old neighbor (identity of which can be stored at the time of wrap initiation), it changes the WTR time period to zero (it enters the idle state).
22. When a node receives a local protection request of type SD or SF and it cannot be executed (according to protocol rules), then the node keeps the request pending.

Figure 2:
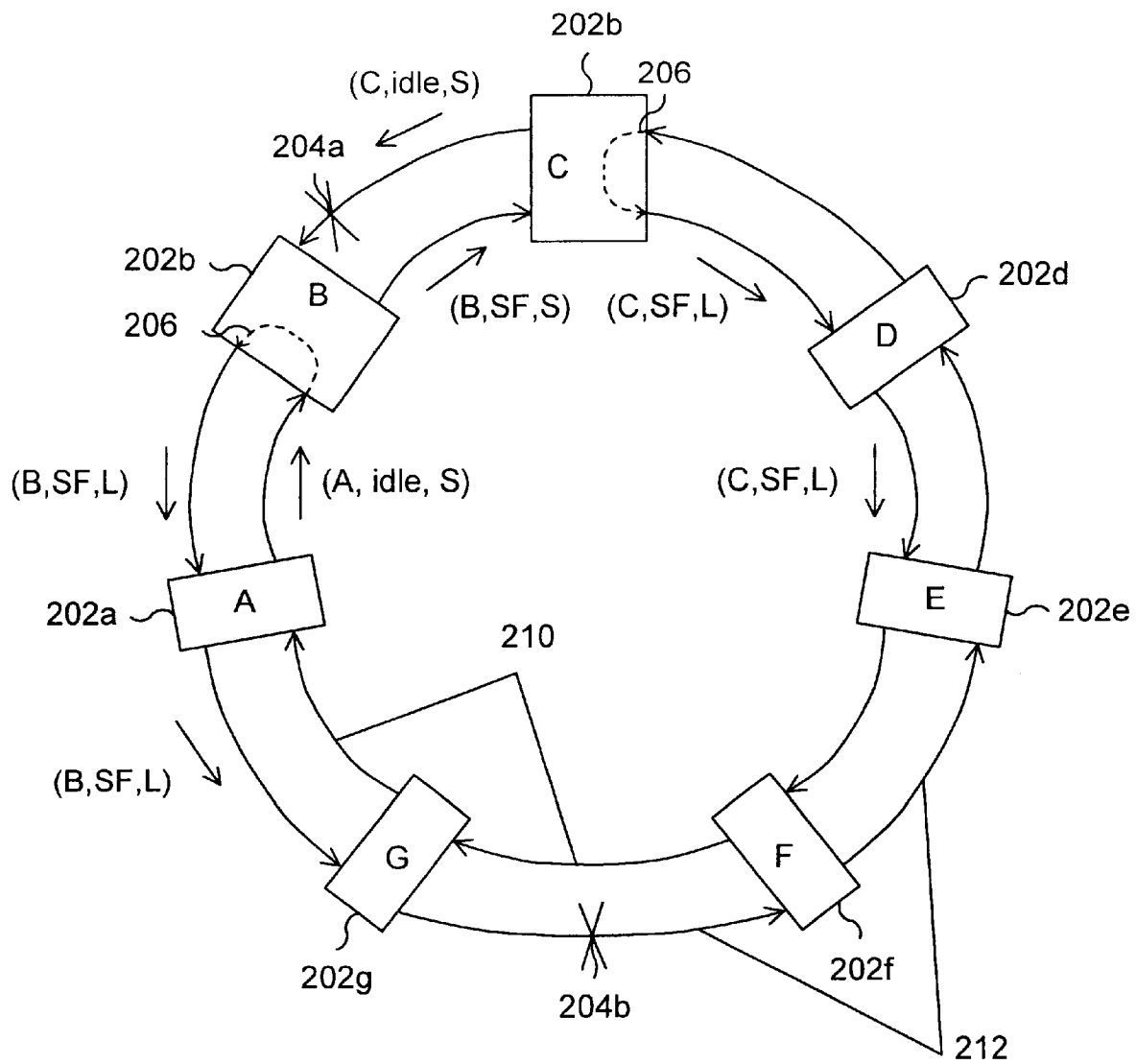
FIG. 2 is block diagram of a ring network utilizing a protection protocol according to an embodiment of the present invention.

FIG. 2 is a block diagram showing a ring network system utilizing a method of fault recovery according to an embodiment of the present invention. The ring network 200 is shown to include nodes 202a–202g. The nodes 202a–202g are shown to be coupled via an inner ring 210 in which the data flows in one direction, such as a clockwise direction. Additionally, the nodes 202a–202g are also shown to be coupled by an outer ring 212 in which data can flow in the opposite direction to the inner ring 210, such as in a counter-clockwise direction. The ring network 200 is shown to have a situation 204a that requires protection, such as a ring wrap 206.

Several of the rules of the method according to the embodiment of the present invention can be described in conjunction with FIG. 2 referred to in combination with various other figures.

Figure 3A:
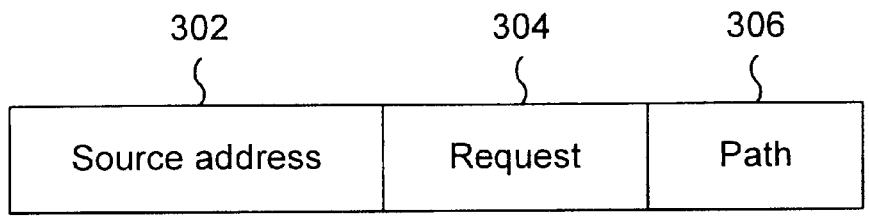
FIGS. 3a and 3b illustrate examples of a message format according to an embodiment of the present invention for a message being sent from one node to another.
Figure 3B:
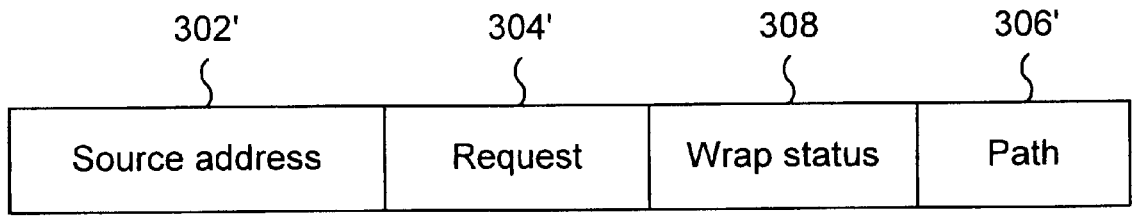

FIGS. 3a and 3b show examples of Rule (3), which describe an APS packet message format which can be used in conjunction with the system and method according to the embodiment of the present invention. The format 300 shown in FIG. 3a is shown to include a source address 302, a request 304, and a path 306.

An example of the APS packet message format can be seen in FIG. 2. In FIG. 2, node 202b is shown to send a message to node 202c. Included in the message is the source address: node B; the request: signal fail (SF); and the path: short (S). The source address 302 indicates which node has sent the message, in this example, node 202b is sending the message. The request can indicate the situation 204a, in this example, a signal fail. The path 306 indicates which path the message is taking. The paths can be either short (S) or long (L). The short path is the shortest route between a first node and its neighbor. The long path is the longer route between a first node and its neighbor. Accordingly, the other message sent by node 202b has a source address of B, a request of SF, and a path L being sent along the outer ring 212 in a counter-clockwise direction towards its neighbor node 202c.

Another message sent by node 202a illustrates Rule (6) which states that a node which is neither executing a self detected request nor executing a short path request signals IDLE messages to its neighbors on the ring if there is no long path message passing through the node on that ring. In the example shown in FIG. 2, the IDLE message sent by node 202a is sent prior to receiving the messages regarding the signal fail along the long path. A is message indicates that the source of the message is A, that the request is IDLE (nothing noteworthy is happening), and that the message is being sent along a short path.

An alternative message format 300i is shown in FIG. 3b. This format is shown to include a source address 302i, a request 304i, a wrap status 308 and a path 306i. The wrap status 308 can be used for debugging by a programmer. The wrap status 308 can indicate whether there is a ring wrap currently located on the ring network.

Figure 4:
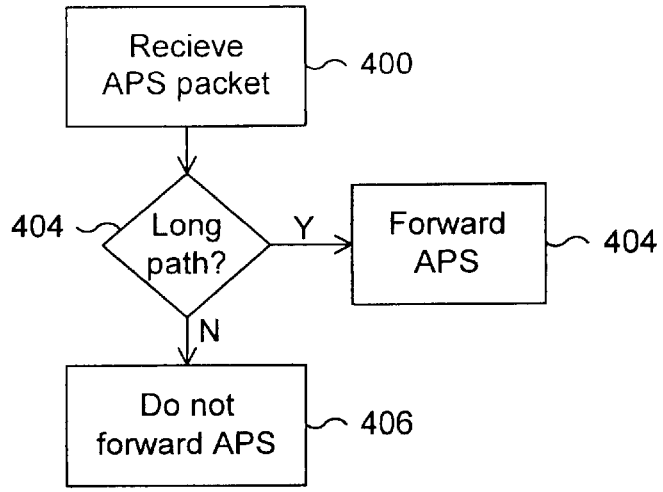
FIGS. 4–6 are flow diagrams illustrating various rules within the protection protocol according to an embodiment of the present invention.

FIG. 4 is a flow diagram of an example of a method according to an embodiment of the present invention implied by Rules 1–22. An APS packet is received via step 400. It is determined whether the APS packet has been sent along a long path via step 402. If the packet was not sent via a long path, then the APS packet is not forwarded via step 406. Accordingly, if the APS packet was sent via the short path, then the packet is not forwarded via step 406. If, however, the packet was sent through the long path via step 402, then the APS packet may be forwarded via step 404. Note that for this example of Rule (1), it is assumed that the long path message does not have to pass through a wrapped connection in order to be forwarded. Otherwise, if the long path message needs to pass through a wrapped connection in order to be forwarded, then the message will simply not be forwarded.

An example of the method shown in FIG. 4 can be seen in FIG. 2. When A receives the message from B (B, SF, L), A forwards the message to its neighbor node 202g because it is a message sent via the long path.

Figure 5:
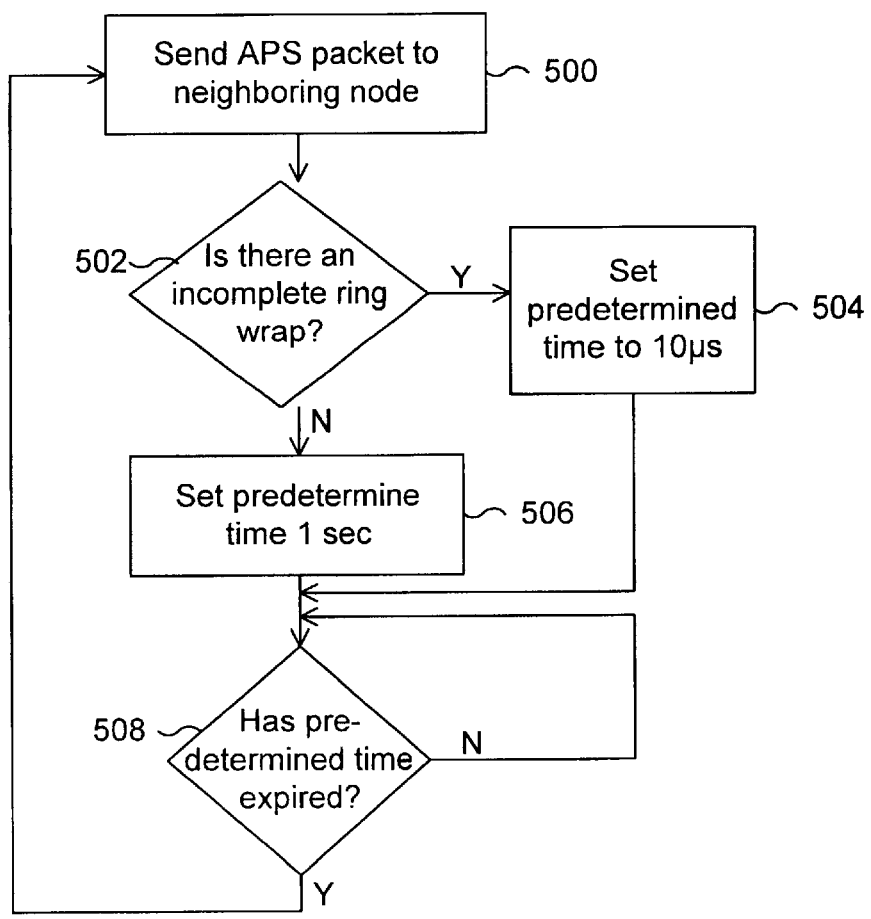

FIG. 5 is a flow diagram illustrating Rule (2) of the method according to the embodiment of the present invention. An APS packet is sent to a neighboring node via step 500. It is then determined if there is an incomplete ring wrap via step 502. An incomplete ring wrap is ring wrap procedure that has initiated but not yet completed. If there is no incomplete ring wrap on the ring network via step 502, then a pre-determined time is set to an IDLE time, such as one second, via step 506. The IDLE time is a pre-determined time that is set during a time when there is no incomplete ring wrap. If, however, a problem is detected, for example, a signal for a ring wrap occurs, via step 502, then a pre-determined time is set to a protection time, such as 10 msec., via step 504. The protected time is a pre-determined amount of time utilized when the ring network is in the process of being protected, for example by creating a ring wrap. Once a pre-determined time has been set, either via step 506 or 504, the pre-determined time is then measured out via step 508 and another APS packet is sent to the neighboring node via step 500. Once the ring wrap is completed, then IDLE time is again implemented.

An example of the method shown in FIG. 5 can be seen in FIG. 2. Node 202a, prior to receiving node 202b is long path message, sends an IDLE message to 202b regularly at intervals set by the pre-determined time.

Figure 6:
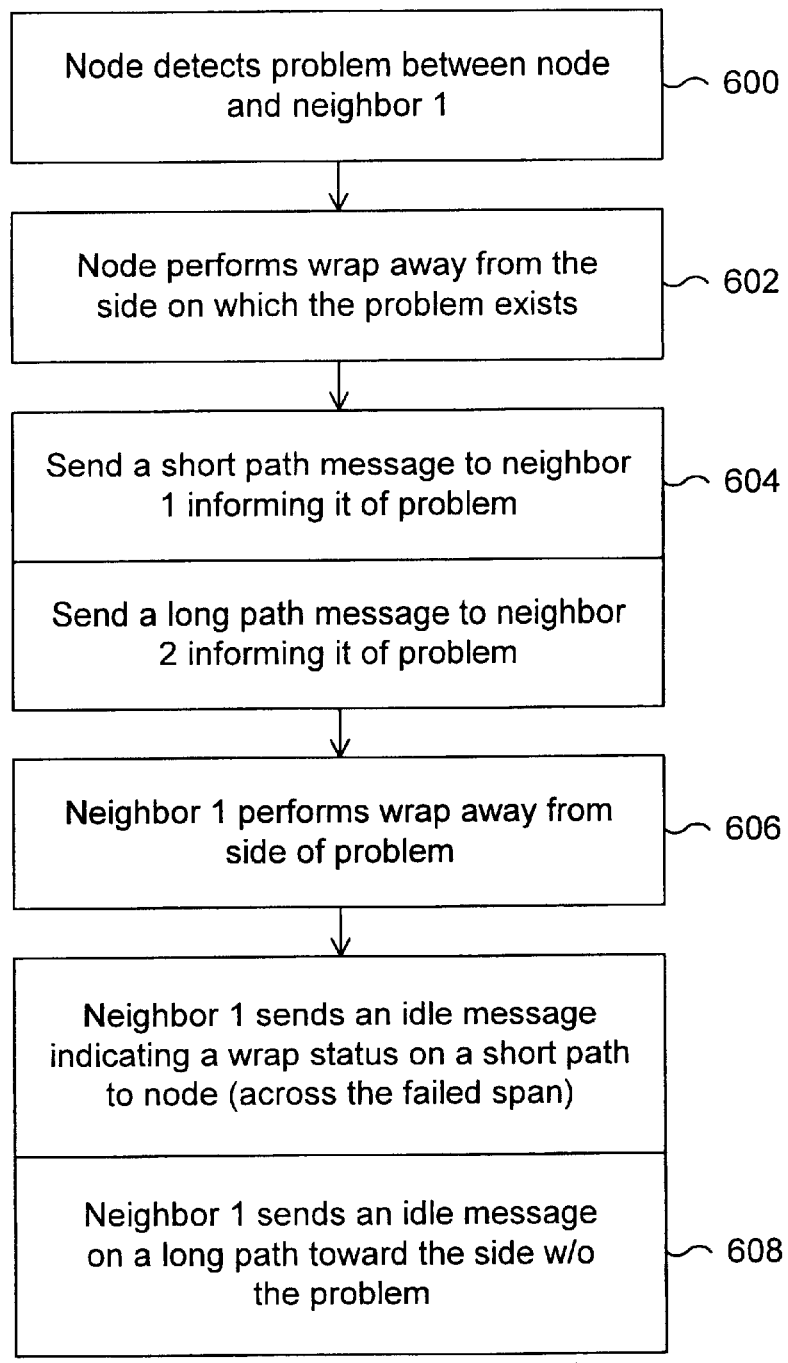

FIG. 6 is a flow diagram illustrating Rules 4 and S. A node detects a problem between the node and a first neighbor via step 600. The node performs a wrap away from the side on which the problem exists via step 602. A short path message is then sent to the first neighbor informing it of the problem via step 604. Additionally, a long path message is also sent to a second neighbor informing the second neighbor of the problem via step 604. The first neighbor then performs a wrap away from the side of the problem via step 606. The first neighbor also sends an IDLE message, indicating a wrapped status, on a short path to the node that detected the problem via step 608. This message is sent across the failed span. Note that IDLE messages do not get wrapped and are sent across failed spans if possible. Additionally, the first neighbor also sends a message on a long path toward the side without the problem via step 608.

An example of the method described in FIG. 6 can be seen in FIG. 2. Node 202b has detected a problem 204a and performs a wrap 206 on the side on which the problem exists. Node 202b also sends a short path message to the neighbor on the other side of the problem 204a, which is node 202c. Node 202b also sends a long path message to its other neighbor node 202a informing it of the problem. Node 202c performs a wrap 206 on the side of the problem and sends an IDLE message on a short path to node 202b. Node 202c also sent a message on a long path toward the side without the problem to its neighbor 202d.

Figure 7:
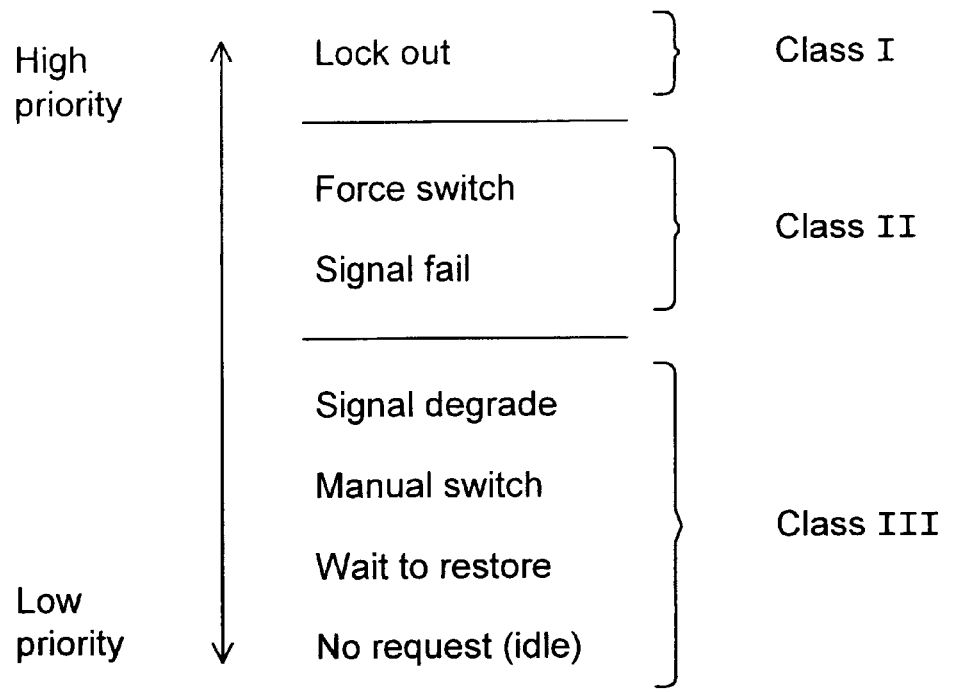
FIG. 7 illustrates an example of a priority hierarchy which can be used according to an embodiment of the present invention.

FIG. 7 lists the hierarchy of priorities of Rule (8). For ease of reference, the hierarchy is separated into Class I-III. Class I is the highest priority, while Class III is the lowest priority. An example of a highest priority message in Class I is lockout. Lockout is an order stating that the ring network is not to wrap under any circumstances.

Examples of the next priority listed in Class II are forced switch and signal fail. Forced switch indicates that the ring network is configured to wrap at the point of the forced switch. Signal fail is a situation where either two nodes cannot communicate with each other, or one node cannot hear the other node. An example of a signal fail is a physical break in the communication lines between two nodes.

Examples of a priority hierarchy which can exist in Class III include signal degrade, manual switch, wait-to-restore, and no request (IDLE). A signal degrade indicates that two nodes can communicate, however there are errors in the communication. Manual switch is a situation where the ring network has been configured to wrap at the manual switch point. The difference between a forced switch and a manual switch is that the only command which overrides a forced switch is a lockout, while a manual switch can be overridden by any command which is above it in the hierarchy (signal degrade, signal fail, forced switch, and lockout). Wait-to-restore is a transitional state which waits for a predetermined time after a failure has been resolved prior to entering a no request (IDLE) state. Although the failure has been resolved, the wrap is not unwrapped for a predetermined time (zero to several minutes such as five minutes). This predetermined time is user configurable. No request (IDLE) indicates that nothing of significance is occurring and no wrap is being executed.

Note that members of Class II can co-exist (Rule 9). For example, multiple forced switches and signal fails can co-exist. Additionally, members of Class I can co-exist (Rule 10). For example, multiple lockouts in a single ring network can co-exist. However, situations in Class III cannot co-exist with other situations (Rule 11). For example, a signal degrade cannot co-exist with a wait-to-restore.

When there are multiple requests of the same priority within Class III, the first request to complete a long path signaling will take priority (Rule 13). For example, if there are two signal degrades located on the same ring network, then the first signal degrade which completes the long path signaling will take priority over the other signal degrade. By not allowing members of Class III to co-exist with one another, partitioning of the ring network is avoided.

In case of two equal requests within Class III on both inner and outer rings of the ring network, the tie is broken by choosing a request on one of the rings, such as the outer ring request (Rule 14). For example, if a signal degrade occurs both on the inner and outer rings, then a request on a pre-determined ring, such as the outer ring, will take priority over the other requests.

Figure 8:
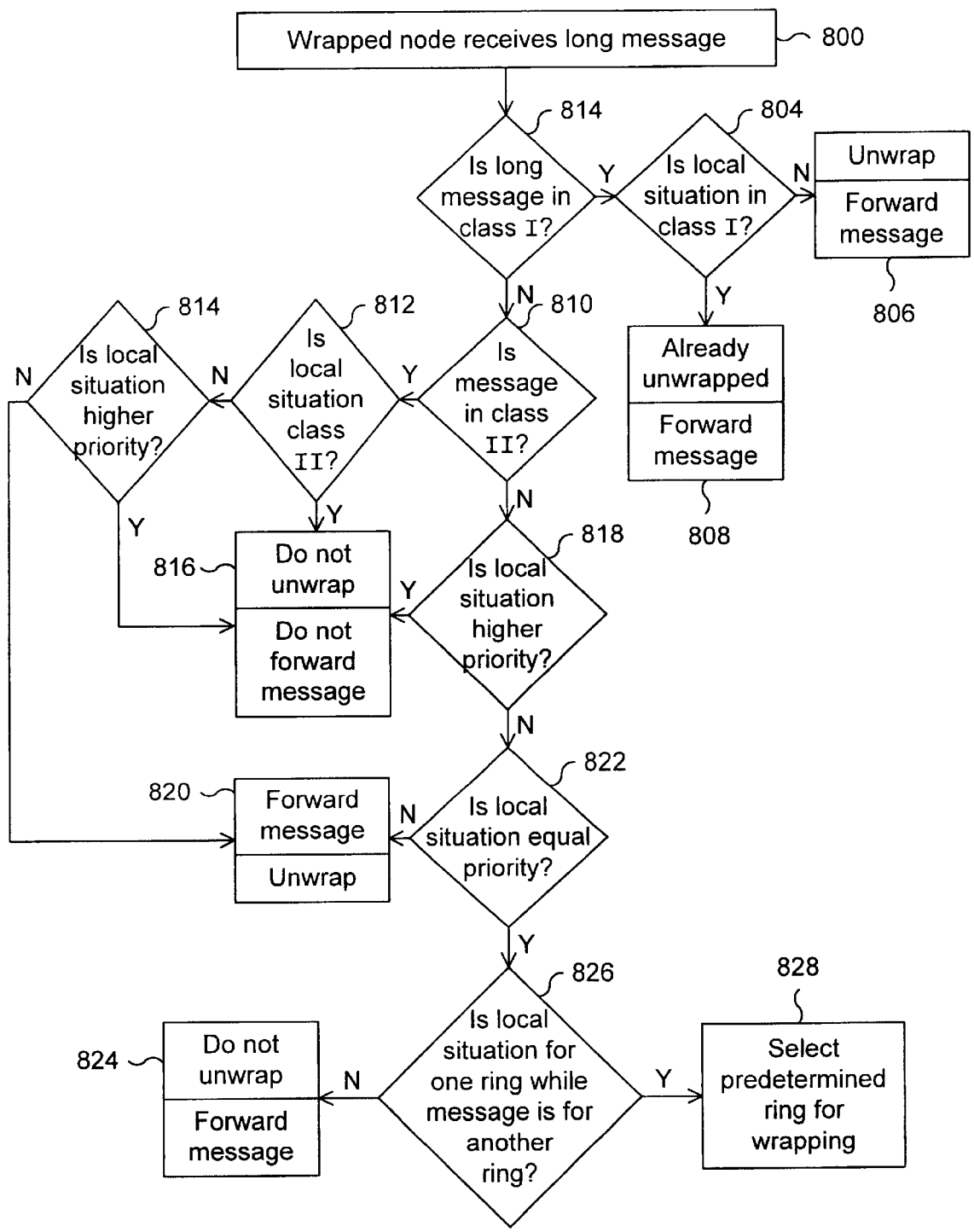
FIGS. 8–12 are flow diagrams and a system diagram illustrating further rules of the protection protocol according to an embodiment of the present invention.

FIG. 8 is a flow diagram illustrating Rules (9), (10), (11), (13), and (15). Note that the flow diagram described in FIG. 8 is merely an example of one way in which the rules of the method according to the embodiment of the present invention can be executed. For example, the determination of whether the long path message is a Class I request via step 802 or a Class II request via step 810 can be in reverse order.

A wrapped node receives a long path message via step 800. It is then determined if the long path message is a Class I request via step 802. The classes used in FIG. 8 are meant to correspond with the example of classes defined in FIG. 7. If the long path message is a Class I request, then it is determined if a local situation also has a Class I request via step 804. A local situation includes scenarios such as when a node detects a situation or problem, or when a node is made aware of a problem or situation via a short path message from its neighbor. If a local situation is not a Class I request via step 804, then any existing local wraps are unwrapped and the long path message is forwarded via step 806. If, however, a local situation is a Class I request via step 804, then the connections are already unwrapped or was never wrapped, and the long path message is forwarded via step 808.

If the long path message is not a Class I request via step 802, then it is determined whether the long path message is a Class II request via step 810. If the long path message is a Class II request via step 810, it is determined whether a local situation is in a Class II request via step 812. If a local situation has a Class II request via step 812, then no local wraps are unwrapped and the long path message is not forwarded via step 816.

If a local situation is not a Class II request via step 812, then it is determined whether a local situation has higher priority over the long path message via step 814. If the local situation does have higher priority, then local wraps are not unwrapped and the long path message is not forwarded via step 816. If, however, the local situation does not have a higher priority than the long path message via step 814, then the long path message is forwarded and local wraps are unwrapped via step 820.

If the long path message is not a Class II request via step 810, then it is determined whether a local situation has higher priority than the long path message via step 818. If a local situation does have higher priority than the long path message, then local wraps are not unwrapped and the long path message is not forwarded via step 816. If, however, a local situation does not have higher priority over the long path message via step 818, then it is determined whether a local situation has equal priority with the long path message via step 822. If the local situation does not have equal priority with the long path message, then the long path message is forwarded and local wraps are unwrapped via step 820.

If, however, the local situation has equal priority with the long path message via step 822, then it is determined whether a local situation relates to one network ring, such as the inner ring, while the long path message relates to another network ring, such as the outer ring, via step 826. If both the local situation and the long path message relate to the same ring, then local wraps are not unwrapped and the long path message is forwarded via step 824. If, however, a local situation is for one ring while the long path message is for another ring via step 826, then a pre-determined ring, such as the outer ring, is selected for wrapping via step 828.

Figure 9:
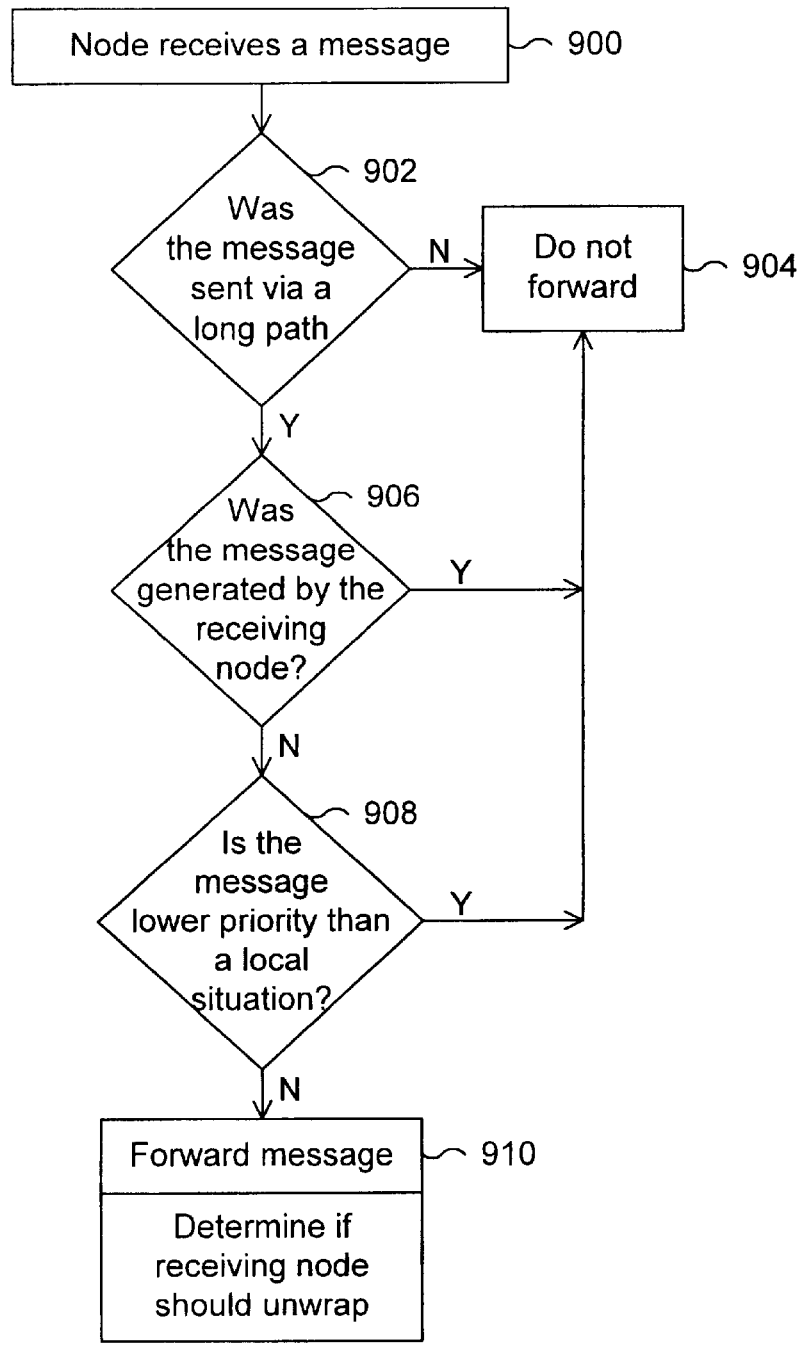

FIG. 9 is a flow diagram illustrating Rules (15), (16), and (17) of the method according to the present invention. A node receives a message via step 900. It is then determined if the message was sent through a long path via step 902. If the message was not sent by a long path, then the message is not forwarded via step 904. If, however, the message was sent through a long path via step 902, then it is determined whether the message was generated by the receiving node via step 906.

If the message was generated by the receiving node, then the message is not forwarded via step 904. If, however, the message was not generated by the receiving node via step 906, then it is determined whether the message has a lower priority than a local situation via step 908. If the message does have a lower priority than a local situation, then the message is not forwarded via step 904. If, however, the message does not have a lower priority than a local situation via step 908, then the message is forwarded and it is determined if the receiving node should unwrap via step 910. The determination of whether the receiving node should unwrap can be determined by using the method illustrated in FIG. 8.

Figure 10:
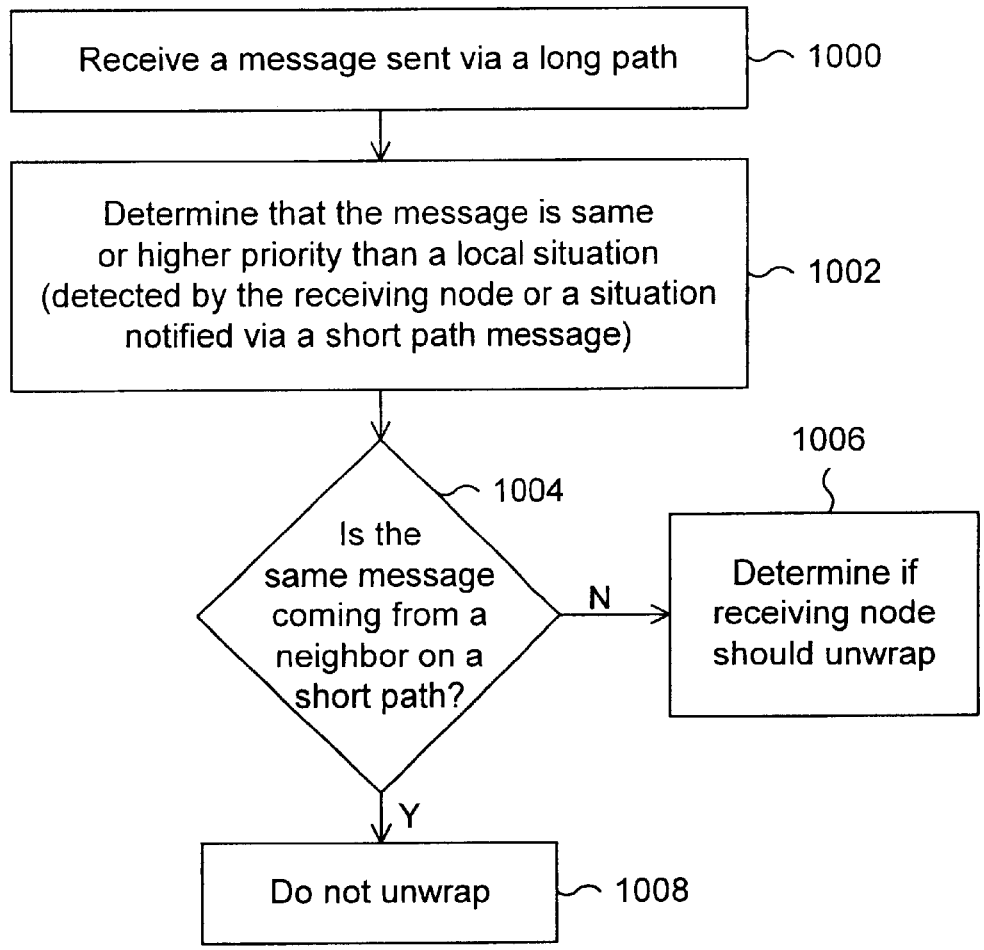
Figure 11:
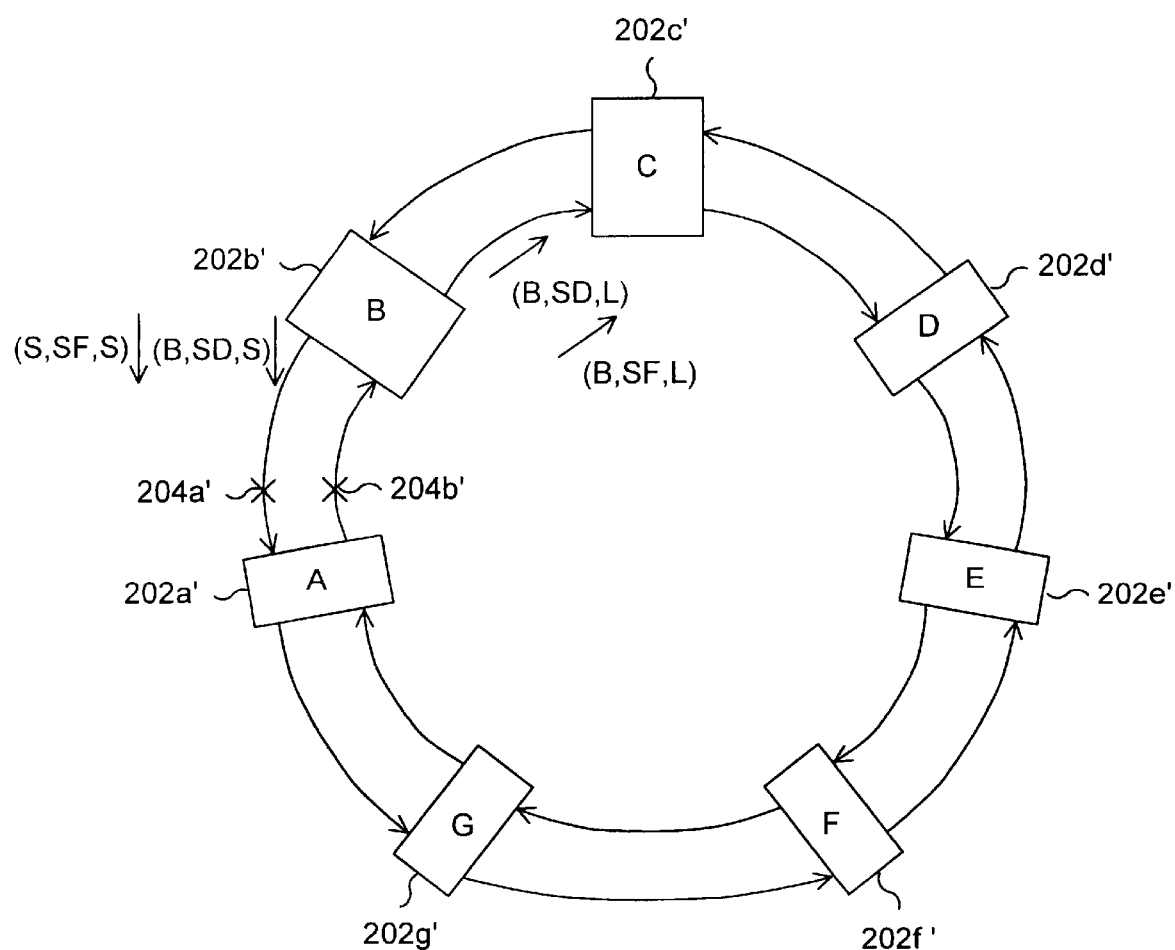

FIGS. 10 and 11 illustrate Rule (17) of the method according to the present invention. A long path message is received via step 1000. For this example, the situation is such that it is determined that the message is the same or of higher priority than a local situation via step 1002. As previously stated, a local situation is intended to include a situation which has been detected by the receiving node as well as a situation which was notified to the receiving node via a short path message.

It is then determined if the same message is coming from a neighboring node on a short path via step 1004. If the same message is not coming from a neighboring node on a short path, it is determined whether the receiving node should unwrap any existing local wraps via step 1006. If, however, the same message is coming from a neighboring node on a short path via step 1004, then the receiving node does not unwrap any existing local wraps via step 1008.

An example of the method illustrated in FIG. 10 can be seen in the block diagram of FIG. 11. Assume that the receiving node is node 202ai. Problems 204ai and 204bi have been detected by node 202bi. Originally, the problems 204ai and 204bi were signal degrades. Accordingly, node 202bi sends a short path message to its neighbor node 202ai indicating that there is a signal degrade, as well as a long path message towards its other neighbor node 202ci indicating that there is a signal degrade. Assume that the signal degrade turns into a signal fail, for example, a technician has disconnected the wiring. Node 202bi will then send a short path message to its neighbor, node 202ai indicating that a signal fail has occurred, while also sending a long path message to its other neighbor node 202ci indicating that a signal fail has occurred.

Assume that the long path message indicating the signal fail arrives prior to the short path message indicating the signal fail. Examples of when this can occur can include when a node is down or comes back up or two separate ring networks are merged together. When node 202ai receives the long path message with the higher priority (SF) from its neighbor node 202bi then the short path message it received from its neighbor 202bi, then node 202ai does not unwrap if it does not receive a corresponding short path message from its neighbor node 202bi. Accordingly, this long path message from a neighbor does not cause a wrap or an unwrap.

Figure 12:
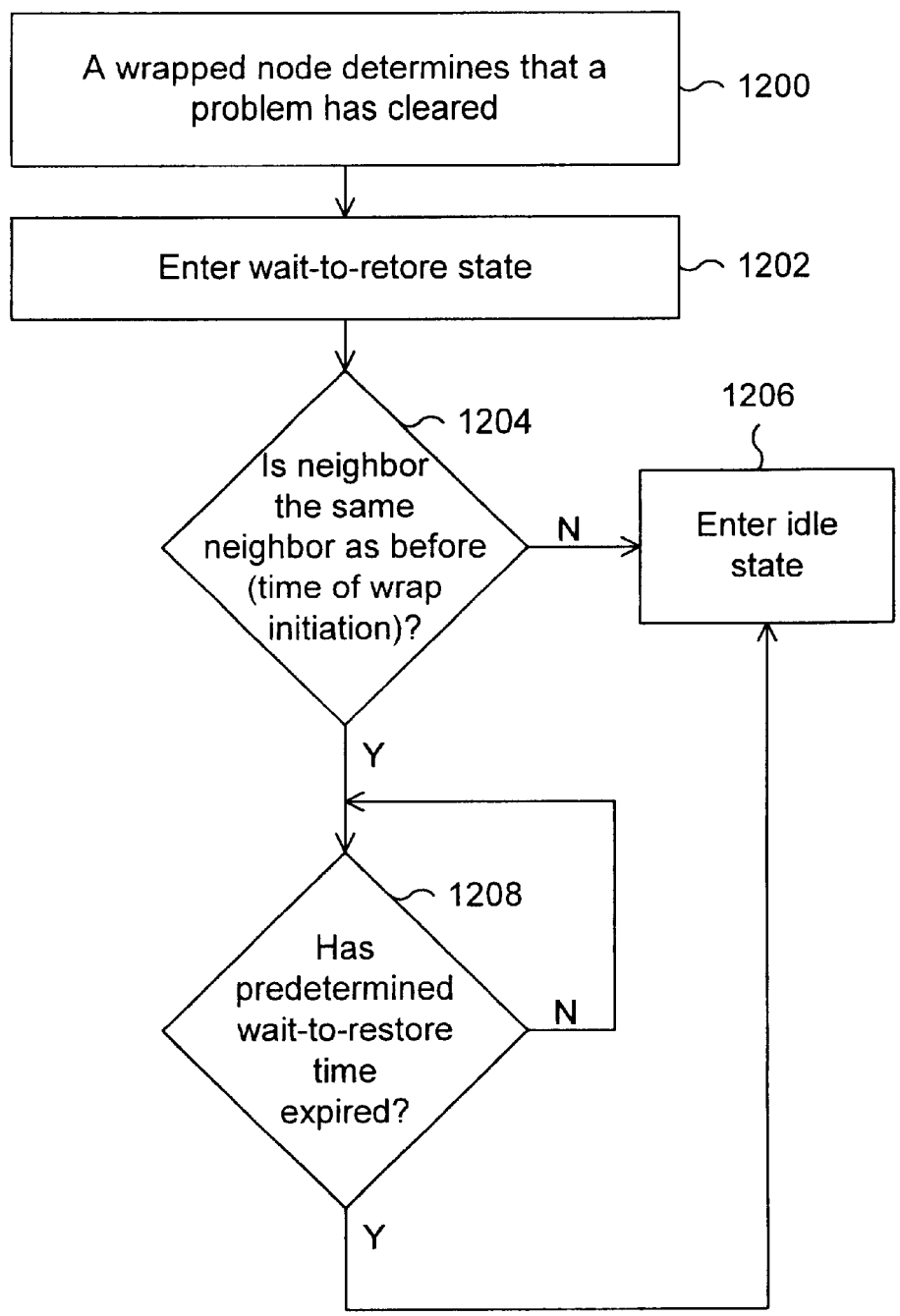

FIG. 12 is a flow diagram illustrating rules (20) and (21) of the method according to the embodiment of the present invention. A wrapped node determines that a problem has been cleared via step 1200. It then enters a wait-to-restore state via step 1202. It is then determined if its neighbor is the same neighbor as previously noted via step 1204. The node can save the source of a short path message at the time of wrap initiation to note the identity of its neighbor. If the current neighbor is not the same as the previous neighbor via step 1204, then an IDLE state is entered via step 1206. If, however, the current neighbor is the same as the previous neighbor via step 1204, then it is determined whether a pre-determined wait-to-restore time has expired via step 1208. Once the pre-determined wait-to-restore time has expired, then the node enters an IDLE state via step 1206.

A method and system for fault recovery for a two line bi-directional network has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there may be variations to the embodiment and that such variations are within the spirit and scope of the present invention. Accordingly, many modifications may be made by one of ordinary skill in the art without departing from the spirit and scope of the appended claims.

What is claimed is:

1. A method for adding a new node to a ring computer network, the ring network including a plurality of nodes, the method comprising:

detecting a situation by a first node, wherein the first node is one of the plurality of nodes;

sending a first message from the first node to a second node, wherein the first node is adjacent to the second node prior to the addition of the new node but is no longer adjacent to the second node subsequent to the addition of the new node;

initiating a fault recovery procedure in response to the first message;

sending a second message from the new node to the second node;

receiving the second message from the new node at the second node;

determining that the source of the second message is a node other than the first node; and entering an idle state in response to said step of determining that the source of the second message is a node other than the first node.

2. The method of claim 1, wherein the step of initiating a fault recovery procedure comprises starting a wait-to-restore timer.

3. The method of claim 2, wherein the fault recovery procedure comprises inhibiting the second node from entering the idle state until the wait-to-restore timer has either expired or been reset to zero.

4. The method of claim 3, wherein the step of entering an idle state comprises resetting the wait-to-restore timer to zero.

5. The method of claim 3, wherein the situation is a signal degrade.

6. The method of claim 1, wherein the situation is a signal fail.

7. A system for fault recovery for a ring computer network, the system comprising:

a first node comprising part of said ring computer network;

a second node connected to said first node in a position in the ring computer network adjacent to said first node;

wherein the first node is configured to detect a situation and send a first message to the second node via a short path;

wherein the second node is configured to receive the first message and initiate a fault recovery procedure in response thereto; and wherein the first node is further configured to send a second message to the second node when a predetermined time has expired, the predetermined time being set to a first time during a period when a fault recovery procedure is in the process of being implemented and set to a second time when no fault recovery procedure is in effect or a fault recovery procedure is already in effect.

8. The system of claim 7, wherein the first node is further configured to initiate a second fault recovery procedure when the first node detects the situation.

9. The system of claim 7, wherein the second node is further configured to initiate the fault recovery procedure when the second node receives the short path message.

10. The system of claim 7, wherein the fault recovery procedure is a ring wrap.

11. The system of claim 7, wherein the predetermined time is a user-configurable time.

12. The system of claim 7, wherein the first message includes a message source.

13. The system of claim 7, wherein the first message includes a message request.

14. The system of claim 13, wherein the message request includes information regarding the situation.

15. The system of claim 7, wherein the first message includes a path indicator.

16. The system of claim 15, wherein the path indicator includes one of a set of options including a short path and a long path.

17. The system of claim 7, wherein the first message includes a wrap status.

18. The system of claim 7, wherein the first node is further configured to send a second message, the second message being sent via a long path.

19. The system of claim 7, wherein the second node is further configured to send a third message indicating an idle status, the third message being sent via a short path.

20. The system of claim 7, wherein the second node is further configured to send a fourth message indicating a protection request, the fourth message being sent via a long path.

21. The system of claim 7, further comprising a third node configured to send a fifth message to a fourth node, the fifth message indicating an idle status, wherein the third node has not received a long path message.

22. The system of claim 7, wherein first message does not pass through the fault recovery procedure.

23. The system of claim 7, wherein the fault recovery procedure is bi-directional.

24. The system of claim 7, wherein the situation is one of a plurality of situations, wherein the plurality of situations is organized in a priority hierarchy.

25. The system of claim 24, wherein the priority hierarchy includes a first class, wherein the first class includes situations with a first priority level, and wherein a first situation included in the first class can co-exist with a second situation also included in the first class.

26. The system of claim 24, wherein the priority hierarchy includes a second class, wherein the second class includes situations with a second priority level, and wherein a first situation included in the second class can co-exist with a second situation also included in the second class.

27. The system of claim 24, wherein the priority hierarchy includes a third class, wherein the third class includes situations with a third priority level, and wherein a first situation included in the third class cannot co-exist with a second situation also included in the third class.

28. The system of claim 27, wherein a message to first complete a long path signaling takes priority when there are a plurality of messages with a same priority level, the priority level being in the third class.

29. The system of claim 27, wherein the ring computer network includes a first ring and a second ring, the first ring and second ring both coupling the plurality of nodes in the ring computer network, wherein a seventh message is received via the first ring and an eighth message is received via the second ring, wherein the seventh message and the eighth message indicate situations with an equal priority, and wherein the equal priority is in the third class, then one of the seventh and eighth messages is selected based on a predetermined selection of one of the first and the second rings.

30. The system of claim 24, wherein a local situation, which is one of the plurality of situations, takes priority over a non-local situation unless there is a long path message passing through a local node.

31. The system of claim 30, wherein the local situation is one of a short path request and a self detected request.

32. The system of claim 7, wherein the first message is not forwarded.

33. A computer program product for fault recovery for a first node configured to be included in a ring computer network, the computer program product being embodied in a computer readable medium and comprising computer instructions for:

detecting a situation;

sending a first message via a short path to a second node;

initiating a first fault recovery procedure for the first node approximately when the situation is detected;

initiating a second fault recovery procedure for the second node when the second node receives the short path message; and sending a second message between the node and the second node when a predetermined time has expired, wherein the predetermined time is set to a first time during a period when a fault recovery procedure is in the process of being implemented, and set to a second time when no fault recovery procedure is in effect or a fault recovery procedure is already in effect.

34. The computer program product of claim 33, wherein the fault recovery procedure initiated for the first node is a ring wrap.

35. The computer program product of claim 33, wherein the predetermined time is a user-configurable time.

36. The computer program product of claim 33, wherein the first message includes a message source.

37. The computer program product of claim 33, wherein the first message includes a message request.

38. The computer program product of claim 33, wherein the first message includes information regarding the situation.

39. The computer program product of claim 33, wherein the first message includes a path indicator.

40. The computer program product of claim 39, wherein the path indicator includes one of a set of options including a short path and a long path.

41. The computer program product of claim 33, wherein the first message includes a wrap status.

42. The computer program product of claim 33, wherein the second message is sent via a long path.

43. The computer program product of claim 33, further comprising computer instructions for sending a third message indicating an idle status by the second node, the third message being sent via a short path.

44. The computer program product of claim 33, further comprising computer instructions for sending a fourth message indicating a protection request by the second node, the fourth message being sent via a long path.

45. The computer program product of claim 33, further comprising computer instructions for sending a sixth message to a third node by a fourth node, the sixth message indicating an idle status, wherein the fourth node has not received a long path message.

46. The computer program product of claim 33 wherein the first message does not pass through the fault recovery procedure initiated for the first node.

47. The computer program product of claim 33, wherein the fault recovery procedure initiated for the first node is bi-directional.

48. The computer program product of claim 33, wherein the situation is one of a plurality of situations, wherein the plurality of situations is organized in a priority hierarchy.

49. The computer program product of claim 48, wherein the priority hierarchy includes a first class, wherein the first class includes situations with a first priority level, and wherein a first situation included in the first class can co-exist with a second situation also included in the first class.

50. The computer program product of claim 48, wherein the priority hierarchy includes a second class, wherein the second class includes situations with a second priority level, and wherein a first situation included in the second class can co-exist with a second situation also included in the second class.

51. The computer program product of claim 48, wherein the priority hierarchy includes a third class, wherein the third class includes situations with a third priority level, and wherein a first situation included in the third class cannot co-exist with a second situation also included in the third class.

52. The computer program product of claim 51, wherein a message to first complete a long path signaling takes priority when there are a plurality of messages with a same priority level, the priority level being in the third class.

53. The computer program product of claim 51, wherein the ring computer network includes a first ring and a second ring, the first ring and second ring both coupling the plurality of nodes in the ring computer network, wherein a seventh message is received via the first ring and an eighth message is received via the second ring, wherein the seventh message and the eighth message indicate situations with an equal priority, and wherein the equal priority is in the third class, then one of the seventh and eighth messages is selected based on a predetermined selection of one of the first and the second rings.

54. The computer program product of claim 48, wherein a local situation, which is one of the plurality of situations, takes priority over a non-local situation unless there is a long path message passing through a local node.

55. The computer program product of claim 54, wherein the local situation is one of a short path request and a self detected request.

56. The computer program product of claim 33, wherein the first message is not forwarded.

* * * * *

UNITED STATES PATENT AND TRADEMARK OFFICE
CERTIFICATE OF CORRECTION

PATENT NO.   : 6,430,700 B1
DATED        : August 6, 2002
INVENTOR(S)  : Feisal Daruwalla et al.

It is certified that error appears in the above-identified patent and that said Letters Patent is hereby corrected as shown below:

<u>Column 11,</u>
Line 18, for the claim reference numeral "3", should read -- 1 --.

Signed and Sealed this

Eleventh Day of March, 2003

JAMES E. ROGAN
*Director of the United States Patent and Trademark Office*